(12) United States Patent
Hollars

(10) Patent No.: US 7,857,167 B1
(45) Date of Patent: Dec. 28, 2010

(54) COMPRESSED GAS CARTRIDGE PERMEATION DISPENSER HAVING A PREDICTABLE PERMEATION RATE

(76) Inventor: Anthony Scott Hollars, c/o Genuine Innovations, Inc. 2700 E. Bilby Rd., Tucson, AZ (US) 85706

( * ) Notice: Subject to any disclaimer, the term of this patent is extended or adjusted under 35 U.S.C. 154(b) by 1213 days.

(21) Appl. No.: 11/213,407

(22) Filed: Aug. 29, 2005

(51) Int. Cl.
*B67D 7/00* (2010.01)

(52) U.S. Cl. .................. 222/5; 277/910; 422/40

(58) Field of Classification Search .......... 222/3, 222/5, 394, 399, 542; 277/650, 910; 422/45, 422/48, 40
See application file for complete search history.

(56) References Cited

U.S. PATENT DOCUMENTS

| | | | | |
|---|---|---|---|---|
| 1,625,044 A * | 4/1927 | McKeown | ..................... | 222/3 |
| 2,552,857 A * | 5/1951 | Knapp | ......................... | 222/547 |
| 2,596,415 A * | 5/1952 | Kochner | ..................... | 222/83 |
| 2,641,253 A * | 6/1953 | Engelder | ............... | 128/203.21 |
| 2,649,661 A * | 8/1953 | Lamb | ..................... | 137/505.38 |
| 2,679,140 A * | 5/1954 | Burchett | ..................... | 222/192 |
| 3,269,598 A * | 8/1966 | Butters et al. | ................... | 222/5 |
| 3,352,456 A * | 11/1967 | Swineford | ..................... | 222/5 |
| 3,361,298 A * | 1/1968 | Trumble | ....................... | 222/5 |
| 3,459,331 A * | 8/1969 | Hogg | ............................. | 222/5 |
| 3,716,245 A * | 2/1973 | Turolla | ....................... | 277/584 |
| 3,776,227 A * | 12/1973 | Pitesky et al. | .......... | 128/205.21 |
| 3,857,754 A * | 12/1974 | Hirata et al. | ................ | 428/35.7 |
| 4,068,780 A * | 1/1978 | Fegley | ........................... | 222/5 |
| 4,489,855 A * | 12/1984 | Boetger | ........................ | 222/5 |
| 4,498,605 A * | 2/1985 | Mackal et al. | .................. | 222/5 |
| 4,525,396 A * | 6/1985 | Takasa et al. | .............. | 428/34.2 |
| 4,966,317 A * | 10/1990 | Barr | ............................. | 222/5 |
| 4,977,018 A * | 12/1990 | Irrgeher et al. | ............ | 428/314.4 |
| 5,076,468 A * | 12/1991 | Mackal | ........................... | 222/5 |
| 5,201,193 A * | 4/1993 | Sundhar et al. | ............... | 62/293 |
| 5,215,217 A * | 6/1993 | Leslie | ........................... | 222/5 |
| 5,303,732 A * | 4/1994 | Jonsson | ...................... | 137/318 |
| 5,588,676 A * | 12/1996 | Clark et al. | ................. | 280/741 |
| 5,651,477 A * | 7/1997 | Takahashi et al. | .............. | 222/3 |
| 5,664,804 A * | 9/1997 | Saccone | ..................... | 280/737 |
| 5,894,869 A * | 4/1999 | Mussack | ...................... | 141/19 |
| 5,964,725 A * | 10/1999 | Sato et al. | .................. | 604/4.01 |
| 5,967,191 A * | 10/1999 | Mummolo | .................. | 138/97 |
| 6,220,274 B1 * | 4/2001 | Wang | ......................... | 137/231 |
| 6,447,585 B1 * | 9/2002 | Buchholz et al. | ............. | 96/234 |
| 6,503,295 B1 * | 1/2003 | Koros et al. | .................... | 95/51 |
| 6,520,323 B1 * | 2/2003 | Colombo | ................. | 206/213.1 |
| 6,601,731 B2 * | 8/2003 | Wu | ................................ | 222/5 |
| 6,759,008 B1 * | 7/2004 | Patterson et al. | ............. | 422/45 |
| 6,797,325 B2 * | 9/2004 | Wang et al. | ................. | 427/336 |
| 6,843,388 B1 * | 1/2005 | Hollars | ......................... | 222/5 |
| 6,843,829 B2 * | 1/2005 | Simmons | ....................... | 95/49 |
| 6,997,347 B2 * | 2/2006 | Peng et al. | ..................... | 222/3 |
| 7,282,189 B2 * | 10/2007 | Zauderer | .................... | 423/220 |

(Continued)

*Primary Examiner*—Kevin P Shaver
*Assistant Examiner*—Andrew Bainbridge
(74) *Attorney, Agent, or Firm*—Dale F. Regelman; Quarles & Brady LLP

(57) ABSTRACT

The invention relates to the field of portable compressed gas cartridge dispensers comprising the ability to predictably permeate the pressurized gas contained within a compressed gas cartridge. An object of the invention is to predict leak rate thus dispensing life and to provide a substantially constant leak rate for the cartridge usable life until the compressed gas cartridge is substantially spent. Another object of the invention is to harness the permeated gas for various applications.

7 Claims, 5 Drawing Sheets

U.S. PATENT DOCUMENTS

| | | | |
|---|---|---|---|
| 7,297,184 B2 * | 11/2007 | Gobina | 96/11 |
| 7,299,816 B2 * | 11/2007 | Rouleau et al. | 137/68.3 |
| 7,334,598 B1 * | 2/2008 | Hollars | 137/116.3 |
| 2003/0015020 A1 * | 1/2003 | Geier et al. | 73/23.31 |
| 2003/0031883 A1 * | 2/2003 | Hochi et al. | 428/463 |
| 2003/0161985 A1 * | 8/2003 | Lauer | 428/64.1 |
| 2003/0226446 A1 * | 12/2003 | Simmons | 96/4 |
| 2004/0040609 A1 * | 3/2004 | Oishi et al. | 138/141 |
| 2004/0216508 A1 * | 11/2004 | Hirsch et al. | 73/1.04 |
| 2005/0284293 A1 * | 12/2005 | Rubas | 96/8 |
| 2008/0034964 A1 * | 2/2008 | Schmidt et al. | 95/12 |

* cited by examiner

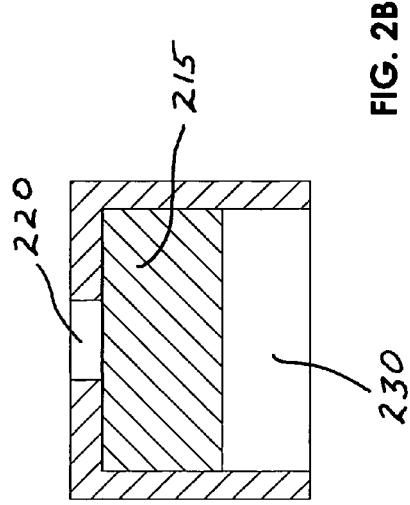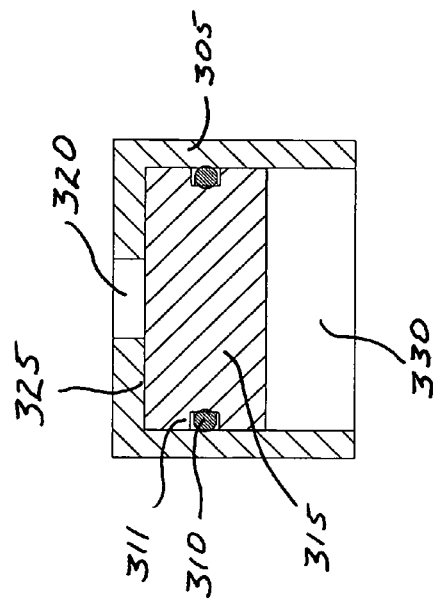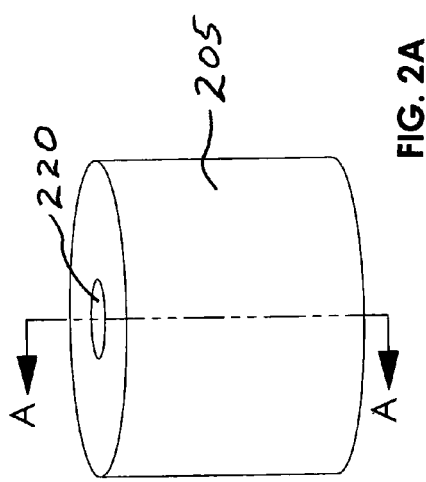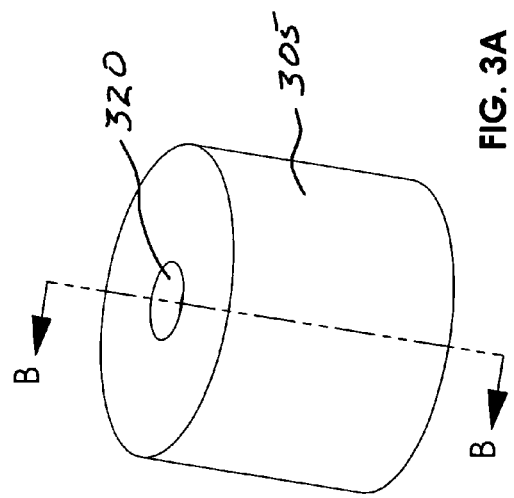

COMPRESSED GAS CARTRIDGE PERMEATION DISPENSER HAVING A PREDICTABLE PERMEATION RATE

CROSS REFERENCE TO RELATED APPLICATIONS

Not applicable.

FEDERALLY SPONSORED RESEARCH

Not applicable.

REFERENCE TO A MICROFICHE APPENDIX

Not applicable.

FIELD OF THE INVENTION

The present invention relates to the field of portable compressed gas cartridge dispensers comprising the ability to predictably permeate the pressurized gas contained within a compressed gas cartridge.

BACKGROUND OF THE INVENTION

A non all-inclusive variety of applications relevant to the current permeation dispenser apply to such applications as maintaining an inert gas environment, plant feeding, aquarium water treatment, constant lubrication delivery, maintaining positive pressures, and many other applications as will become evident from the embodiments and examples to follow.

Maintaining an inert gas environment applies to such applications as food preservation, including beverages and frozen articles, cigar and tobacco preservation, minimizing oxidation to optics and numismatics, moisture prevention in substantially sealed boxes, shielding sensitive electronics, ammunition/gun storage, museum preservation of items sensitive to the environment (such as vintage documents), and controlling chemical reactions. Desiccants have served many applications for controlling moisture while backfilling a closed container with an inert gas has proven to be an effective method to concentrate the contained environment with the inert gas. Additionally, pulling vacuum on a container has proven an effective method to minimize the oxygen, for example, in a contained environment.

The afore-mentioned backfilling example requires an auxiliary tank and means of a connection from the tank to the closed container. Unfortunately, if a leak occurs over time, there is no additional supply of inert gas introduced into the closed container. Such a situation can prove substantially ineffective, particularly if the container is left unchecked for a long amount of time. Such an example could be a numismatic collection deposited in a safety deposit box. A careful person may include a desiccant with the collection or backfill a closed container with an inert gas. Should the container leak, the entire effort has been ineffective. Additionally, a fuel cell may require that a hydrogen and/or oxygen chamber remain pressurized and the present invention can support this need.

Minimizing oxidation to optics also similarly applies to the above numismatic example. Many telescopes are completely exposed to the elements thus requiring a user to consistently clean delicate mirrors. More complex systems are closed but after time, some optics require that the coatings be stripped off and recoated primarily due to oxidation and/or cleaning the critical surfaces. An inert environment would help to reduce moisture and oxidation problems in delicate optics.

A chemist may require a concentration of a certain gas such as an inert environment to control or prevent a chemical reaction. A small device capable of reliable delivery of such a gas would be very useful in such an application.

A slow gas delivery directly to a plant's root system has been commercially available at least in the form of nutrient sticks that release beneficial nutrients upon contact with water, for example. In a hydroponic application, a slow release of a gas to the water solution has typically been accomplished via a pressure regulator attached to a large storage bottle such as to control pH or increase carbon dioxide levels.

Aquariums have benefited from the introduction of gases into the water for reasons such as maintaining pH or changing gas concentration levels. Acidic and basic chemicals are used, sometimes in the form of gases. A long-term delivery device is not available.

On a heavy equipment vehicle that requires consistent lubrication at its rotating joints, a mechanic typically crawls around the vehicle and lubricates each joint individually on a regular basis. A controlled-release delivery of a compressed gas could be harnessed to inject lubricants directly into all joints thus only requiring occasional inspections and lubricant/compressed gas cartridge replacement. Similarly, applications in elevators, conveyor systems, bridges and other applications that may be exposed to the elements and/or less than easily accessible are equally suited for such a lubrication system.

Maintaining a positive pressure on a closed system is also an aspect of the permeation invention. No pressure regulator is utilized. Rather, slow permeation of the compressed gas fills a container. Excessive pressures are prevented by providing a blow-off or check valve that is easily available in the current market. Maintenance of a positive pressure on a system minimizes the introduction of foreign particles into the positive pressure environment, similar to the function of a clean room.

Many current art compressed gas dispensers, particularly the models manufactured by Genuine Innovations, Inc. in Tucson, Ariz. U.S.A. are manufactured to dispense a non-threaded neck compressed gas cartridge, a threaded neck compressed gas cartridge, or capable of dispensing both species with the same dispenser. U.S. Pat. No. 6,843,388 titled: Compressed gas cartridge dispensing system allowing interchangeable use of different capacity compressed gas cartridges and novel storage feature by Hollars, filed Jul. 22, 2002 exemplifies the capabilities of the current art compressed gas dispensers.

One feature of current art compressed gas dispensers is a lance housing that has been used in part to contain the high pressure from a compressed gas cartridge. Historically, lance housings have been manufactured from metal such as brass. A lance housing also provides an excellent recess or pocket for a seal that is used to contain the compressed gas in a lanced cartridge. A lance housing can feature internal threads that are used to mate with a compressed gas cartridge also exhibiting a threaded portion. A lance housing sometimes exhibits no threads to mate with a compressed gas cartridge and can accept only non-threaded varieties.

The compressed gas cartridge dispenser comprising a predictable permeation rate will function with any of these differing types of threaded and non-threaded lance housings and compressed gas cartridges. The preferred embodiment and alternative embodiments will be exemplified in the following paragraphs and in the FIGS.

The following embodiments will describe the afore-mentioned prior-art and the present invention. Additionally, with the aid of figures, one skilled in the art will be able to understand and appreciate the embodiments to follow.

OBJECTS AND ADVANTAGES

Accordingly, several objects and advantages of the present invention will be presented in the following paragraphs followed by a thorough disclosure of each accompanying embodiment in the DETAILED DESCRIPTION.

In light of the above-mentioned problems, it is therefore an object of the present invention to provide a simple method of manufacturing a compressed gas permeation dispenser therefore minimizing material and labor expenses.

Another object of the present invention is to provide a permeation dispenser capable of disposal after use.

Another object of the permeation dispenser is the ability to predict the leak rate thus dispensing life.

It is another object of the present invention to utilize as little metal as possible in a lance housing and incorporate as many features and components as possible out of injection moldings, particularly for affordable manufacturing reasons.

Further objects and advantages will become apparent in the following paragraphs. Solely and in combination, the above objects and advantages will be illustrated in the exemplary figures and accompanying embodiments to follow.

BRIEF DESCRIPTION OF THE DRAWINGS

The figures are exemplary of different embodiments of the present invention. Each illustration conveys the invention and is not to be considered as limiting, rather, exemplary to the scope and spirit of the present invention. Like components in the figures share identical numbering.

FIG. 2A illustrates another exemplary front view of a compressed gas cartridge permeation dispenser, according to an embodiment of the present invention;

FIG. 2B illustrates a cross-section view of the compressed gas cartridge permeation dispenser from FIG. 2A;

FIG. 3A illustrates another exemplary front view of a compressed gas cartridge permeation dispenser having a piston sealed by a permeable seal, according to an embodiment of the present invention;

FIG. 3B illustrates a cross-section view the compressed gas cartridge permeation dispenser from FIG. 3A;

DETAILED DESCRIPTION

The following paragraphs will detail, at minimum, the best mode of the present invention. The exemplary figures and description of the invention as it is exemplified in each figure is representative of the current invention and the scope of the invention disclosure is not intended to be limited by the exemplary teachings. Like physical structure in different figures share the same identifying numbers.

Figure 1B:
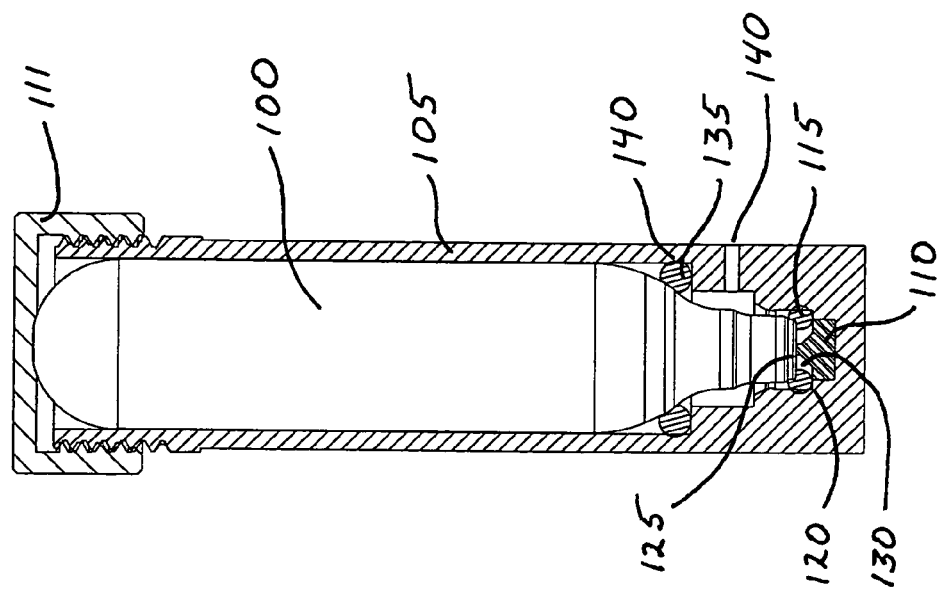
FIG. 1B illustrates a cross-section view of the exemplary compressed gas cartridge permeation dispenser from FIG. 1 comprising a permeation seal situated about a cartridge piercing lance.
Figure 1A:
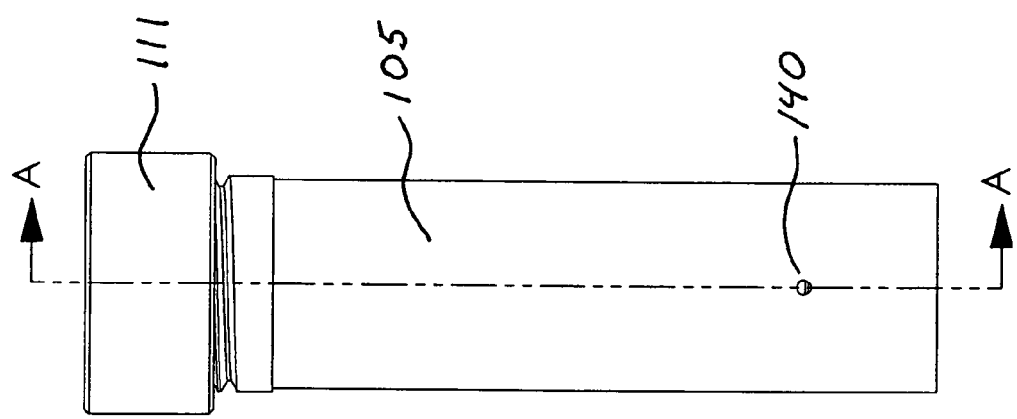
FIG. 1A illustrates an exemplary front view of a compressed gas cartridge permeation dispenser, according to an embodiment of the present invention.

FIGS. 1A and 1B respectively illustrate front and cross-section views of an exemplary compressed gas cartridge permeation dispenser comprising a permeation seal situated about a cartridge piercing lance, in accordance with an embodiment of the present invention. A compressed gas cartridge 100 situates within a permeation dispensing body 105. Exemplified in FIG. 1B, compressed gas cartridge 100 is shown punctured by a piercing lance 110, urged into place by a cap 111 and the high pressure from compressed gas cartridge 100 is contained by a permeation seal 115 by means of compressing permeation seal 115 between a lance seat 120 and a cartridge face 125. A high pressure zone 130 is defined by the pressure contained area created by permeation seal 115. A low pressure seal 135 locates in a seat 140, preferably integrated into the inside diameter of dispensing body 105. Low pressure seal 135 provides a seal between compressed gas cartridge 100 and permeation dispensing body 105.

As gas permeates from high pressure zone 130, through permeation seal 115, and eventually will exit out of an outlet 140. Outlet 140 can conceivable vent to the atmosphere or outlet 140 can fluidly attach to another device so, for example, work can be performed on the device by the slow delivery of gas. Throughout these paragraphs, exemplary usage examples are discussed that can be applied to such a permeation dispenser.

FIGS. 2A and 2B respectively illustrate front and cross-section views of another exemplary compressed gas cartridge permeation dispenser having a permeation element, in accordance with an embodiment of the present invention. No compressed gas cartridge is illustrated in FIG. 2A or 2B but situates within permeation dispensing body 205 and is lanced through any lancing means known in the art. A high pressure zone 230 is illustrated that is contained in part by a permeation element 215 and permeation body 205. Permeation element 215 can be composed of any material that is semi-permeable such as from a family of rubber, densely sintered metal, or any other suitable material that experimentally is determined appropriate to provide a desired permeation rate.

FIGS. 3A and 3B respectively illustrate front and cross-section views of another exemplary compressed gas cartridge permeation dispenser having a piston sealed by a permeable seal, in accordance with an embodiment of the present invention. A permeation body 305 has a piston 315 situated within its bore. Piston 315 rests against a bottom bore 325 of permeation body and comprises a seal 310 residing in a seat 311. Seal 310 functions as the permeation element in this embodiment and can be easily changed out to different materials should one desire faster or slower permeation rates. Additionally, seal 310 and piston 315 diameters can be adjusted to increase or decrease the permeation surface area. A high pressure zone 330 is illustrated that is contained in part by piston 315 and seal 310 assembly and permeation body 305. A compressed gas cartridge and lancing means are not illustrated in FIG. 3A or 3B but lancing means are so common in the art that the FIGS. concentrate on the immediate invention. A vent 320 allows permeated gas to escape permeation body 305 and like in other embodiments, can fluidly attach to another device, tubing, or nothing.

Figure 4:
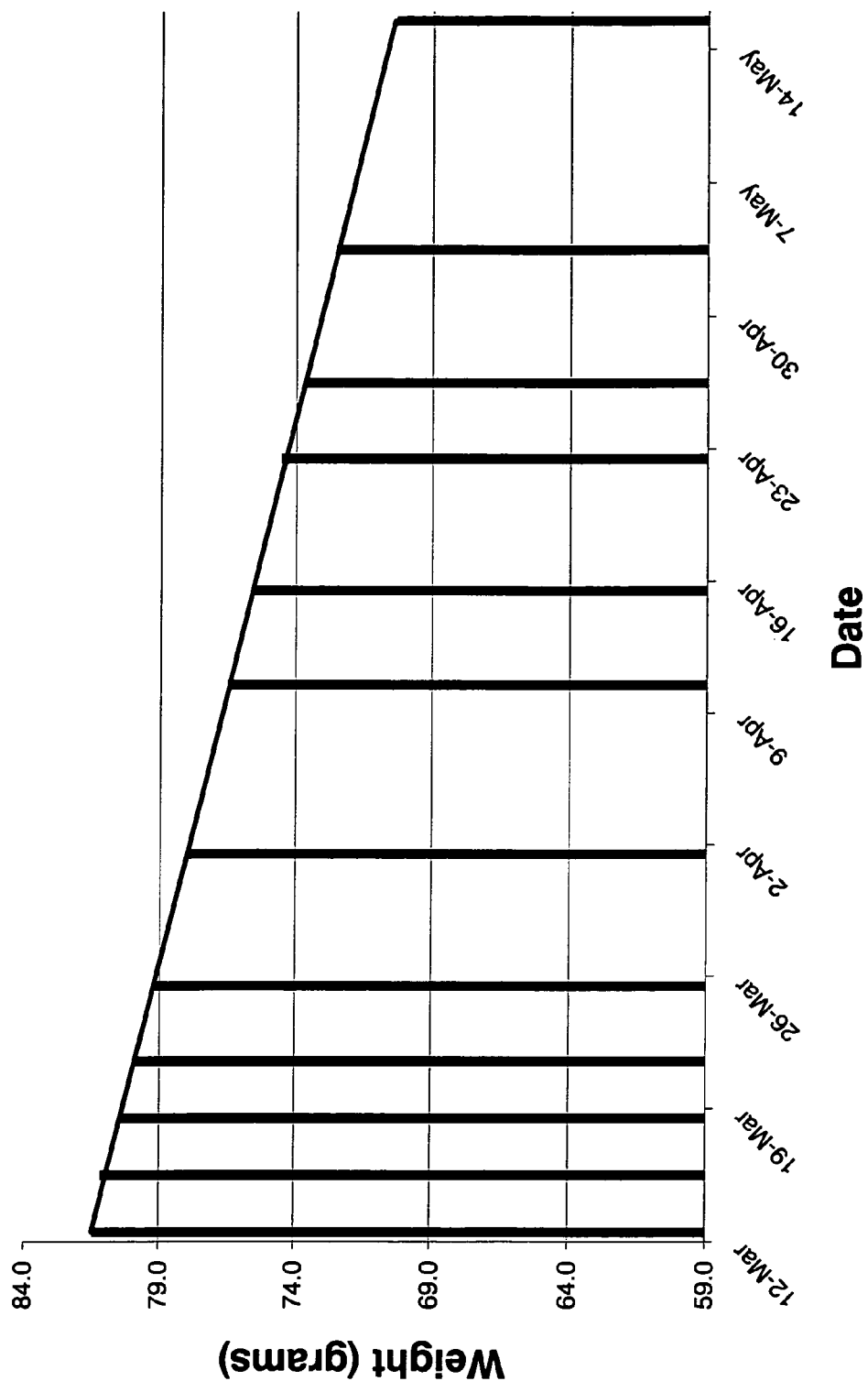
FIG. 4 illustrates experimentally-derived permeation rate data for carbon dioxide gas permeating through a silicone elastomeric element, in accordance with an embodiment of the present invention.

FIG. 4 graphically illustrates experimentally-derived data for a silicone permeation element situated about a cartridge-piercing lance, such as embodied in FIG. 1, subjected to full cartridge pressure. The weight of a full compressed gas cartridge commonly called a 12-gram is about 81.5 grams. The 12-gram is descriptive of cartridge contents weight and will vary depending on the amount of cartridge fill and by gas properties such as density and if the gas undergoes a phase change while compressed, etc.

The compressed gas cartridge was lanced and weighed on day one of the experiment. The cartridge was weighed every seven days for two months and the data logged. Surprisingly, the data illustrates that the permeable element provides a substantially linear leak-rate that would take this 12-gram cartridge about 63 days to become exhausted.

A gas such as carbon dioxide changes phase to a liquid when compressed into a compressed gas cartridge. Cartridge pressure remains constant as gas escapes from the cartridge due to the remaining liquid in the reservoir. When no additional liquid remains, cartridge pressure typically tapers down rapidly. The substantially linear leak rate is probably attributed to the constant vapor pressure against the permeable element.

Figure 5:
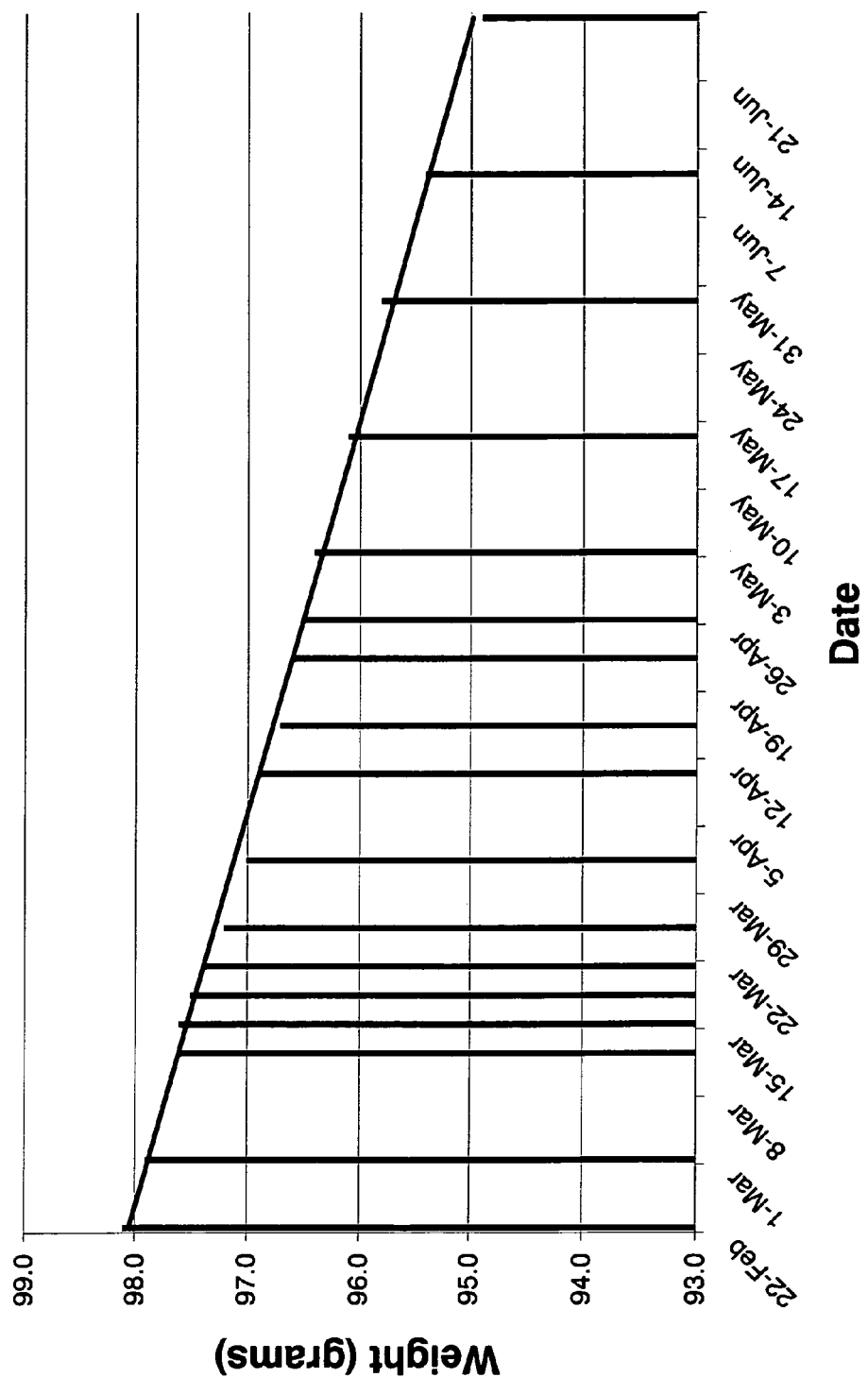
FIG. 5 illustrates experimentally-derived permeation rate data for carbon dioxide gas permeating through a combination of one buna and two urethane elements, in accordance with an embodiment of the present invention.

FIG. 5 graphically illustrates experimentally-derived data for a combination of permeation elements comprising different permeable materials such as buna rubber or urethane, all three located at different locations and individually subjected to cartridge pressure. Similarly to the data of FIG. 4, a 12-gram compressed gas cartridge was lanced while cartridge contents pressure was contained by each of the three permeation elements, each allowed to vent to the atmosphere in this embodiment.

The 12-gram compressed gas cartridge in this experiment weighed about 98 grams when full. The lanced compressed gas cartridge was weighed once every seven days for four months and the data logged. Again, the permeation rate was substantially linear but this time, cartridge exhaustion would require approximately 444 days.

Figure 6:
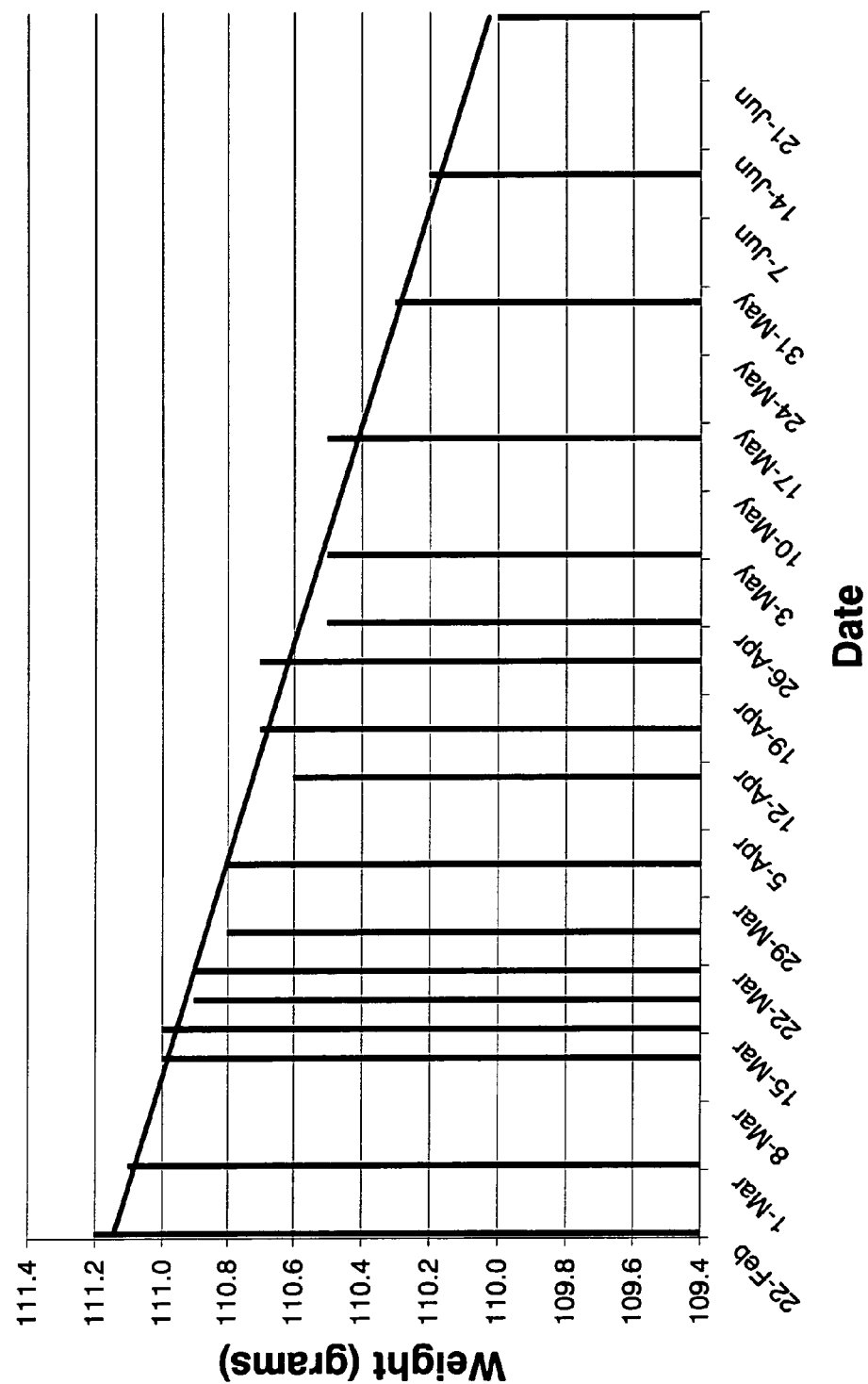
FIG. 6 illustrates experimentally-derived permeation rate data for carbon dioxide gas permeating through a buna rubber element, in accordance with an embodiment of the present invention.

FIG. 6 graphically illustrates experimentally-derived data for a permeation element of buna rubber subjected to cartridge pressure. Similarly to the data of FIGS. 4 and 5, a 12-gram compressed gas cartridge was lanced while cartridge contents pressure was contained by one permeation element, allowed to vent to the atmosphere in this embodiment.

The 12-gram compressed gas cartridge in this experiment weighed about 111.1 grams when full. The lanced compressed gas cartridge was weighed once every seven days for four months and the data logged. Again, the permeation rate was substantially linear but this time, cartridge exhaustion would require approximately 1110 days, or greater than three years.

One skilled in the art could readily experiment using permeable elements having larger or smaller areas and of differing materials to tailor a permeation rate. Fortunately for the linear behavior that describes permeation rates, a short data-gathering term provides foresight for one to predictably estimate the exhaustion date for such a system.

Additionally, one could stack permeation elements in series and/or parallel to tailor permeation to different locations at varying rates while utilizing the same compressed gas cartridge.

An embodiment introduced in the BACKGROUND section was a plant root carbon dioxide delivery system. A compressed gas cartridge containing liquefied carbon dioxide could be nested into a small capsule comprising a permeation element and a vent hole or series of vent holes such that permeated gas would exit through a vent hole. One would simply lance the compressed gas cartridge for example by threading on a cap that forces the cartridge into a piercing lance. The capsule could then be inserted into soil around the base of a plant thus deliver a trickle of carbon dioxide directly to a root area. Chances are that plant roots would be drawn towards the carbon dioxide source thus increasing the effectiveness of a permeation delivery. One could easily attach vent tubing to the vent hole(s) and dispense in one or more locations.

Reducing oxidation to numismatics or optics as introduced in the BACKGROUND section could be accomplished with the gas permeation invention as well. One could lance a compressed gas cartridge in a permeation dispenser having a known dispense time, for example 3 months. Then one could bag or seal the chamber with the permeation dispenser within. Experimentation and container sealing capability would determine if a blow-off valve or check valve would be needed. A slightly positive pressure would probably reduce the chances of foreign particles being introduced into the container. Dozens of commercially available check valve style devices such as duckbill valves, umbrella valves, and flapper valves that will open at a determined pressure are commonly available therefore they will not be discussed here.

Similarly, preservation of fine tobaccos such as cigars could easily justify the small cost of an inert gas permeation device that would protect cigar freshness. A small container could be attached to a permeation dispenser whereby the container could be opened and closed without the need to replace an unused compressed gas cartridge.

Constant lubrication can be achieved through this gas permeation technology. One exemplary method of accomplishing constant lubrication would be to connect a grease reservoir to a zerk fitting, for example on a mining truck. The grease reservoir would be sealed from the elements and would fluidly connect to a permeation dispenser having a known permeation rate. Permeated gas from the compressed gas cartridge could drive a piston above the grease reservoir (ever so slowly) thus provide constant lubrication to a component.

Chemical reactions could be controlled with the present gas permeation dispenser. A chemist could utilize the benefits of a controlled release gas to provide an inert environment for some reaction process such as by concentrating one type of gas into a chamber. Once a permeation rate is known, a flow meter attached to a regulator and a storage bottle may go by the wayside in some applications in favor for the simplicity of this delivery system.

Compressed gas cartridge pressures vary as a function of temperature changes, therefore one may need to consider the permeation rates at different pressures. Depending on the degree of consistency desired for permeation, one could utilize averaging as well as experimental data to determine an average flow rate. Additionally, statistical weather data or climate control information could also be integrated into averaging compressed gas cartridge temperatures and pressures.

I claim:

1. A compressed gas cartridge permeation dispenser, comprising:
    at least one compressed gas cartridge comprising a compressed gas, wherein said compressed gas comprises a liquid portion and a vapor portion;
    a high pressure zone;
    an outlet;

a permeation element disposed between and fluidically connecting said high pressure zone and said outlet, said permeation element compressed against a cartridge face;

wherein said compressed gas permeates from said high pressure zone through said permeation element at a linear rate over time and exits from said outlet.

2. The compressed gas cartridge permeation dispenser of claim 1, wherein:

said compressed gas comprises 12 grams of carbon dioxide;

said permeation element is formed from silicon;

said compressed carbon dioxide gas permeates from said high pressure zone through said permeation element over 63 days.

3. The compressed gas cartridge permeation dispenser of claim 1, wherein:

said compressed gas comprises 12 grams of carbon dioxide;

said permeation element is formed from Buna rubber;

said wherein said compressed carbon dioxide gas permeates from said high pressure zone through said permeation element over 1110 days.

4. A compressed gas cartridge permeation dispenser, comprising:

at least one compressed gas cartridge comprising a compressed gas, wherein said compressed gas comprises a liquid portion and a vapor portion;

a high pressure zone;

an outlet;

a plurality of permeation elements disposed between and fluidically connecting said high pressure zone and said outlet said plurality of permeation elements compressed against a cartridge face;

wherein said compressed gas permeates from said high pressure zone through said plurality of permeation elements at a linear rate over time and exits from said outlet.

5. The compressed gas cartridge permeation dispenser of claim 4, wherein said plurality of permeation elements are stacked in a series.

6. The compressed gas cartridge permeation dispenser of claim 4, wherein:

a first permeation element is formed from Buna rubber;

a second permeation element is formed from urethane; and a third permeation element is formed from urethane.

7. The compressed gas cartridge permeation dispenser of claim 6, wherein:

said compressed gas comprises 12 grams of compressed carbon dioxide; and said compressed carbon dioxide gas permeates through said plurality of permeation elements over 444 days.

\* \* \* \* \*